United States Patent
Owen et al.

(10) Patent No.: US 7,207,606 B2
(45) Date of Patent: Apr. 24, 2007

(54) MECHANICAL PIPE JOINT, GASKET, AND METHOD FOR RESTRAINING PIPE SPIGOTS IN MECHANICAL PIPE JOINT BELL SOCKETS

(75) Inventors: William H. Owen, Fultondale, AL (US); William W. Holmes, IV, Birmingham, AL (US); Daniel A. Copeland, Bessemer, AL (US)

(73) Assignee: United States Pipe and Foundry Company, LLC, Birmingham, AL (US)

( * ) Notice: Subject to any disclaimer, the term of this patent is extended or adjusted under 35 U.S.C. 154(b) by 158 days.

(21) Appl. No.: 10/827,159

(22) Filed: Apr. 19, 2004

(65) Prior Publication Data

US 2005/0230972 A1 Oct. 20, 2005

(51) Int. Cl.
*F16L 19/06* (2006.01)
*F16L 19/08* (2006.01)

(52) U.S. Cl. .................. 285/339; 285/343; 285/104; 285/421; 285/910

(58) Field of Classification Search .............. 285/104, 285/105, 337, 339, 342, 389, 421, 910, 295.2
See application file for complete search history.

(56) References Cited

U.S. PATENT DOCUMENTS

| | | | | |
|---|---|---|---|---|
| 1,277,975 A * | 9/1918 | Mann | .................. | 285/295.2 |
| 2,585,453 A * | 2/1952 | Gallagher et al. | .......... | 285/341 |
| 2,700,774 A * | 2/1955 | Smith | ............................ | 4/417 |
| 2,989,326 A * | 6/1961 | Seward et al. | ................ | 403/12 |
| 3,078,332 A * | 2/1963 | Marx | ........................... | 174/91 |
| 3,724,880 A * | 4/1973 | Seiler | ........................ | 285/105 |
| 3,899,183 A * | 8/1975 | Wild et al. | ................... | 277/619 |
| 3,963,298 A * | 6/1976 | Seiler | ......................... | 277/625 |
| 4,108,481 A * | 8/1978 | Graham | ...................... | 285/231 |
| 4,128,265 A * | 12/1978 | Fenster et al. | .............. | 285/305 |
| 4,136,897 A * | 1/1979 | Haluch | ....................... | 285/342 |
| 4,309,050 A * | 1/1982 | Legris | ........................ | 285/341 |
| 4,540,204 A * | 9/1985 | Battle et al. | ................ | 285/231 |
| 4,660,866 A * | 4/1987 | Jones et al. | ................. | 285/231 |
| 4,685,705 A * | 8/1987 | Jones | .................... | 285/148.23 |
| 4,756,784 A * | 7/1988 | Jones et al. | ................. | 156/157 |
| 4,848,808 A * | 7/1989 | Pannell et al. | .............. | 285/337 |
| 4,867,488 A | 9/1989 | Jones | | |

(Continued)

FOREIGN PATENT DOCUMENTS

| EP | 0334380 | 9/1989 |
|---|---|---|
| EP | 0 794 387 A2 | 9/1997 |
| FR | 2 830 070 A1 | 3/2003 |

*Primary Examiner*—James M. Hewitt
(74) *Attorney, Agent, or Firm*—Alston & Bird LLP (57) ABSTRACT

A mechanical pipe joint, restraining gasket, and method for restraining pipe spigots within adjacent bell sockets. The restraining gasket is composed of two axially-separate components: a sealing portion and a restraining portion made of a plurality of arcuate locking members. The restraining gasket and a gland surround an outer surface of the pipe spigot. The mechanical pipe joint is formed as the pipe spigot is inserted into the bell socket and the gland is axially attached to the bell socket so that the restraining gasket is held between: the gland, an inner surface of the bell socket, and the outer surface of the pipe spigot, so as to provide a fluid seal in the joint and urge the locking members into contact with the outer surface of the pipe spigot, axially restraining the pipe spigot within the bell socket.

25 Claims, 4 Drawing Sheets

U.S. PATENT DOCUMENTS

| | | | |
|---|---|---|---|
| 4,871,197 A | 10/1989 | Codding, III et al. | |
| 4,878,698 A * | 11/1989 | Gilchrist | 285/342 |
| 4,886,304 A * | 12/1989 | Kunsman | 285/104 |
| 5,058,907 A * | 10/1991 | Percebois et al. | 277/626 |
| 5,067,751 A * | 11/1991 | Walworth et al. | 285/105 |
| 5,197,768 A * | 3/1993 | Conner | 285/105 |
| 5,219,189 A * | 6/1993 | Demoisson et al. | 285/105 |
| 5,269,569 A | 12/1993 | Weber et al. | |
| 5,295,697 A | 3/1994 | Weber et al. | |
| 5,335,946 A * | 8/1994 | Dent et al. | 285/243 |
| 5,360,218 A * | 11/1994 | Percebois et al. | 277/619 |
| 5,398,980 A * | 3/1995 | Hunter et al. | 285/337 |
| 5,464,228 A | 11/1995 | Weber et al. | |
| 5,603,530 A * | 2/1997 | Guest | 285/105 |
| 5,695,224 A * | 12/1997 | Grenier | 285/104 |
| 5,779,285 A * | 7/1998 | Robison | 285/337 |
| 5,791,698 A * | 8/1998 | Wartluft et al. | 285/328 |
| 5,803,513 A * | 9/1998 | Richardson | 285/342 |
| 5,947,527 A * | 9/1999 | Carter | 285/4 |
| 6,019,396 A * | 2/2000 | Saito et al. | 285/3 |
| 6,129,391 A * | 10/2000 | Rakieski | 285/93 |
| 6,328,352 B1 * | 12/2001 | Geppert et al. | 285/373 |
| 6,502,867 B2 | 1/2003 | Holmes, IV et al. | |
| 6,988,746 B2 * | 1/2006 | Olson | 285/151.1 |
| 2004/0232699 A1 | 11/2004 | Jones | |
| 2004/0232700 A1 * | 11/2004 | Jones | 285/421 |
| 2004/0233698 A1 | 11/2004 | Jones | |
| 2005/0040645 A1 | 2/2005 | Jones | |
| 2005/0194784 A1 | 9/2005 | Jones et al. | |

\* cited by examiner

MECHANICAL PIPE JOINT, GASKET, AND METHOD FOR RESTRAINING PIPE SPIGOTS IN MECHANICAL PIPE JOINT BELL SOCKETS

FIELD OF THE INVENTION

The present invention relates generally to mechanical joint connections between pipe spigots and bell sockets and, more particularly, relates to a mechanical pipe joint, gasket and method for more effectively sealing and restraining pipe spigots in mechanical joint bell sockets using a gasket with a sealing portion that is axially separated from a restraining portion, the restraining portion having a plurality of arcuate locking members.

BACKGROUND OF THE INVENTION

The construction of pipelines generally involves the axial connection of two pieces of pipe to form a single pipeline conduit for transporting materials from one point to another. Along the pipeline there may be one or more fittings, which allow the pipe pieces to be joined to other components in the pipeline. The liquid or gaseous materials usually conveyed via pipelines require that the pipeline conduits and joints between axially-joined pieces of pipe, and between pipes and fittings, be substantially leak-proof. In addition it is advantageous for the axial joint to have significant strength so as to axially restrain the adjoining pieces of pipe as flow in the pipeline creates thrust forces between the pieces of pipe that tend to counteract the attachment forces axially securing the pipe joint. Those having skill in the art of pipeline construction are thus in search of pipeline components and securing methods for more completely securing pipeline joints to better meet the needs listed above as well as accomplish other objectives as listed in this application.

Existing methods for providing a secure pipeline joint can be distinguished from one another by the procedures and components utilized to form the pipeline joint. In addition, existing pipeline joints vary by the way the pipeline connection components, such as gaskets, locking rings, and other components, are placed and secured within the pipeline joint. The design parameters of a pipeline joint are affected by the methods and components used to construct a given joint, the types of materials transported by the pipeline, the environment in which the pipeline is situated, and other pipeline design factors.

One common method for connecting pipe together involves the insertion of an end of a male piping member (spigot) into an expanded end of a second pipe, the interior profile of which has been specially fabricated to form a socket ("bell socket"). The bell socket is sized to accommodate the spigot end of the male piping member to be received. This connection type is known in the pipe industry as a "push-on joint."

In order to seal and secure a push-on joint, several methods are known in the art. One method involves inserting a fitted gasket within an annular recess formed within the bell socket. Such a gasket is often specially designed to both seal the pipe joint and axially-restrain the pipe spigot within the bell socket by employing stainless steel locking segments that are embedded circumferentially into the elastomeric material gasket as shown in U.S. Pat. Nos. 5,295,697 and 5,464,228 issued to J. Weber and L. Jones on Mar. 22, 1994 and Nov. 7, 1995 respectively. The locking segments in these gaskets extend from the interior surface of the gasket, and away from the interior surface of the bell socket, such that they grip the outer surface of the spigot when the pipeline conduit is subjected to internal pressures. These gaskets couple the axial restraint function with the sealing function in a single-gasket design.

Another method of axially joining pieces of pipe to form a pipeline conduit is referred to as a mechanical joint. In this method, the bell socket has an arrangement for axial attachment to a corresponding gland that is configured to slidably fit on the outer surface of the spigot. In mechanical joints such as those disclosed in U.S. Pat. No. 5,803,513 to Richardson, issued Sep. 8, 1998, an elastomeric gasket and a separate locking ring are positioned between the gland and the bell socket, so that as the gland is attached to the bell socket, the elastomeric gasket is compressed into a sealing position within the bell socket, and the locking ring is urged into contact with the outer surface of the pipe spigot. In the Richardson '513 Patent, the locking ring is prevented from prematurely engaging the spigot by the use of skid pads, which are added to the inner, toothed surface of the locking ring. While the skid pads in the Richardson '513 Patent prevent premature engagement of the locking ring with the outer surface of the spigot, they add cost of materials and labor to the construction of the underlying gasket.

Other mechanical joint pipe joints are disclosed in U.S. Pat. No. 5,398,980 to Hunter et al., U.S. Pat. No. 5,335,946 to Dent et al., and U.S. Pat. No. 4,878,698 to Gilchrist et al. In these patents, there are disclosed various mechanical joint methods utilizing a separate restraining (toothed split ring) and sealing (elastomeric gasket) element positioned within the bell socket and held in place by an axially-attached gland to seal and restrain pipe spigots in mechanical pipe joints. The Hunter '980, Dent '946, and Gilchrist '698 Patents all disclose the placement of the locking elements within the bell socket. As a result, less space is available within the bell socket for the elastomeric gasket. In addition, these methods require the use of two separate components (the split ring and elastomeric gasket) to restrain and seal the spigot within the mechanical joint.

EP 0334380 to Imhof et al discloses another mechanical pipe joint where the joint is sealed and locked by the interaction of several separate layered components including: (1) a clamping ring composed of a plurality of clamping segments, which are interconnected in the circumferential direction by a rubber layer, (2) a joint gasket made of soft elastomeric material, and (3) a sliding ring interposed between the joint gasket and the clamping ring. Thus, the Imhof patent requires three separate components to be assembled within the mechanical joint to produce the desired sealing and locking functions.

In some mechanical pipe joints, it is advantageous to secure pipe spigots made of various materials. For instance, in some cases, there exists a need to secure plastic pipe spigots (such as PVC piping) within a bell socket composed of a different material (such as ductile iron). In this case, however, conventional hardened steel locking segments having a relatively short length can expose the PVC pipe spigot to large localized forces that might damage the PVC material.

In addition, in mechanical piping joints having ductile iron bell sockets and glands and PVC or other plastic pipe spigots, it is advantageous to provide a lighter weight gland so that it is easier for assembly personnel to handle during pipe joint construction. In prior mechanical joints, such as those described in the Hunter '980 patent, the gland includes a "forward end" that extends axially outward from the gland. The extra material added to the gland in the "forward end" structure adds weight and manufacturing complexity to the gland structure. Thus, there exists a need for a mechanical pipe joint that utilizes a more lightweight gland that is easier to handle and is less likely to damage PVC or other plastic pipe spigots during pipe joint construction.

Thus, there exists a need in pipe industry for a mechanical pipe joint, gasket, and method for restraining a pipe spigot within a bell socket utilizing an integrated gasket that improves both: (1) sealing surface area between the inner surface of a bell socket and outer surface of a pipe spigot, and (2) restraining surface area between an inner surface of a restraining portion and an outer surface of a pipe spigot. In addition, there exists a need for locking elements that exert a restraining force that is evenly distributed around the entire circumference of the spigot outer surface, and that engage the spigot outer surface only after the sealing portion of the gasket has been compressed within the bell socket. Also, there exists a need for a mechanical pipe joint gasket that fills the bell socket with an uninterrupted sealing portion. Finally, there exists a need in the industry for a gasket that accomplishes these goals with an easy-to-assemble mechanical pipe joint, that can be utilized with piping components that are made of various materials, including PVC pipe spigots.

SUMMARY OF THE INVENTION

The present invention provides an improved restraining gasket for use in a mechanical pipe joint that improves sealing and restraint functions in joints between fluid piping members. Specifically, the invention provides an improved sealing area between an inner surface of a bell socket and an outer surface of a pipe spigot. The gasket of the present invention also provides a more evenly-distributed radial restraining force on an improved outer surface area of a pipe spigot. The present invention also provides for a mechanical pipe joint utilizing the gasket, and a method for restraining a pipe spigot within a bell socket, utilizing the gasket.

The gasket is composed of a sealing portion and a restraining portion. The sealing portion of the gasket is preferably composed of an elastomeric material and the attached restraining portion comprises a plurality of circumferentially-spaced arcuate locking members composed of a rigid material, each locking member having an inner surface that is adapted to grip the outer surface of a pipe spigot. The arcuate locking members may be circumferentially separated by the elastomeric material of the sealing portion so that the inner surfaces of the arcuate locking members are held initially out of contact with the outer surface of the pipe spigot. Alternatively, the arcuate locking members may be circumferentially separated by a plurality of spacers that are attached to, but separate from, the elastomeric material of the sealing portions. According to one embodiment, the arcuate locking members may be provided with a raised portion disposed circumferentially on their radially-outward surface so as to reduce the contact surface area, and resulting friction, between the locking members and the bearing surface of a gland.

The restraining gasket of the present invention is designed to axially separate the sealing and locking functions of the gasket and achieve, for example, the following advantages: (1) an increase in sealing area within the bell socket, (2) an increase in restraining area in contact with the pipe spigot, as the arcuate locking members are formed in long arcuate sections to conform to the cross-section of the pipe spigot outside the bell socket, and (3) an improved construction of the restraining gasket, so that no separate locking and sealing parts are required.

The restraining gasket of the present invention may be used in the mechanical pipe joint and method of sealing and axially securing a male piping member within an adjoining bell socket of the present invention. The mechanical pipe joint includes a lighter-weight gland having a recessed bearing surface that contacts the outer surfaces of the arcuate locking members. Since the gland has a recessed bearing surface, it contains less material than a standard mechanical joint gland, making it lighter and more easily manipulated by the technician assembling the joint. In the mechanical pipe joint of the present invention, the rigid arcuate locking members may be located outside of the bell socket so that the gland bearing surface may transmit the axial attachment force of the gland bearing surface to the axially-adjacent sealing portion of the gasket. Furthermore, the gland bearing surface may transmit a portion of the axial attachment force into the radial direction so as to urge the locking members into contact with the outer surface of the pipe spigot as the gland is axially attached to the bell socket.

The bell socket of the present invention includes a sealing cavity, which is filled by the sealing portion of the gasket so that the sealing portion of the gasket resides completely within the bell socket, axially separated from the restraining portion of the gasket. This bell socket and gasket arrangement ensures that the circumferential sealing contact between the sealing portion, bell socket, and the pipe spigot, is uninterrupted around the entire circumference of the pipe joint. This feature improves the sealing surface area of the gasket.

The interface between the sealing and restraining portions of the restraining gasket may include a slope so that an axial attachment force imparted by the gland bearing surface on the locking members is first transmitted primarily axially to the sealing portion. This axial force transmission ensures that the sealing portion is seated within the sealing cavity of the bell socket and that a more fluid-tight seal exists between the bell socket, gasket, and spigot. The interface slope may be configured such that the axial attachment force is then directed more in the radial direction so as to urge the arcuate locking members into contact with the outer surface of the pipe spigot once the sealing portion is seated in the sealing cavity of the bell socket. The seated sealing portion also provides a resistive axial force due to its elastomeric compression.

The gasket, mechanical pipe joint, and method of the present invention provide a more complete circumferential seal between the pipe spigot and the inner surface of the bell socket as well as a more evenly distributed radial locking force between the inner surfaces of the arcuate locking members and the outer surface of the pipe spigot. These advantages are provided in a restraining gasket that is configured for use with an improved method and mechanical pipe joint utilizing a lighter weight gland and a bell socket that provides a sealing cavity designed to receive the sealing portion of the gasket. Additionally, the present invention provides a more effective distribution of the axial attachment force imparted on the arcuate locking members by the bearing surface of the gland so that the sealing portion of the gasket is fully compressed and seated within the sealing cavity of the bell socket before the arcuate locking members are urged into radial contact with the outer surface of the pipe spigot.

BRIEF DESCRIPTION OF THE DRAWINGS

The foregoing and other objects or features and advantages of the present invention will be made apparent from the detailed description of the preferred embodiments of the invention and from the following list of drawings which are for illustration purposes and are not necessarily to scale.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
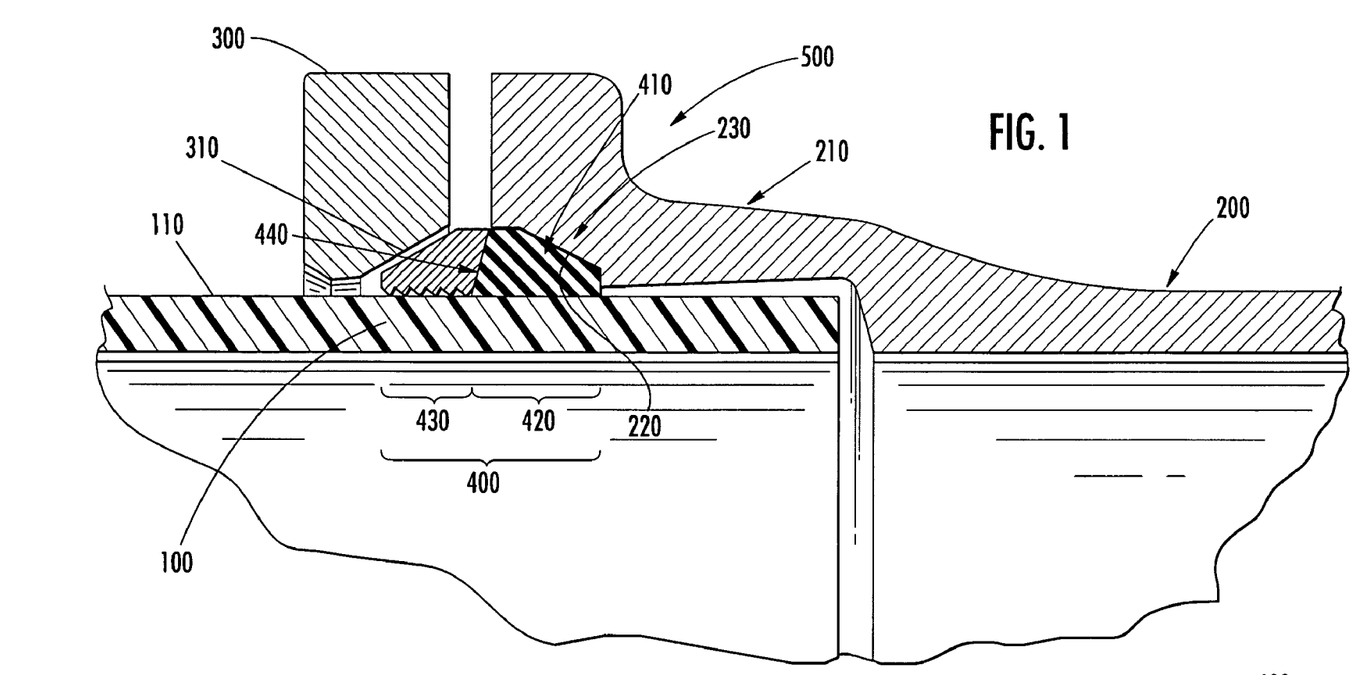
FIG. 1 is a cross-sectional view of one embodiment of the mechanical pipe joint of the present invention.

Referring to FIG. 1, the mechanical pipe joint, restraining gasket and method embodiments of the present invention will be primarily described in conjunction with mechanical pipe joints suitable for round cross-section fluid pipelines. It should be understood, however, that the mechanical pipe joint, restraining gasket and method embodiments of the present invention can be utilized in conjunction with a variety of other applications, both in fluid pipeline conduits and other types of pipelines. For example, the mechanical pipe joint, restraining gasket and method embodiments may be utilized in conjunction with gas pipelines and other applications requiring secure, fluid-tight connections between adjacent piping conduits having various cross-sectional shapes. In addition, embodiments of the present invention will be primarily described in conjunction with mechanical pipe joints connecting elongate female pipe sections comprising bell sockets with male pipe sections, however, it should be understood that embodiments of the present invention may be used with a variety of fluid piping members, including adjoining male and female pipe terminal fittings and other pipe fittings having bell sockets attached thereto configured to receive a male piping member.

Figure 2:
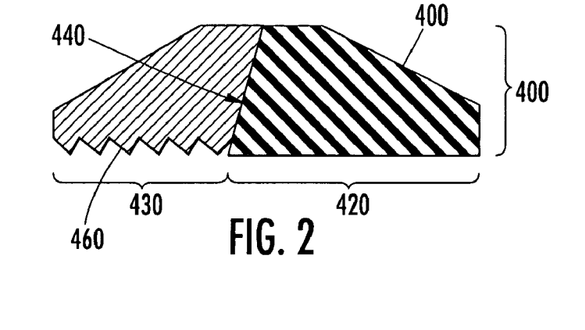
FIG. 2 is a an enlarged cross-sectional view of one embodiment of the restraining gasket of the present invention.

FIGS. 1 and 2 depict one embodiment of the mechanical pipe joint and restraining gasket of the present invention which is configured to axially join a male piping member 100 with a female piping member 200, the female piping member having a bell socket 210 designed for receiving the male piping member. The invention is particularly useful for male piping members 100 made from polyvinyl chloride (PVC), high-density polyethylene (HDPE) and/or any other suitable polymeric material. However, the invention could also be used with male piping members 100 made from ductile iron, steel and/or other metals. The female piping member 200 generally will have a bell socket 210 made from a metal. The male piping member is axially-secured by a combination of forces imparted on its outer surface 110 by a gland 300 slidably encircling the outer surface of the male piping member. A restraining gasket 400 is positioned between the gland 300, the bell socket sealing cavity 230, and the male piping member outer surface 110, the restraining gasket 400 having a sealing portion 420 and a restraining portion 430.

Figures 3, 4:
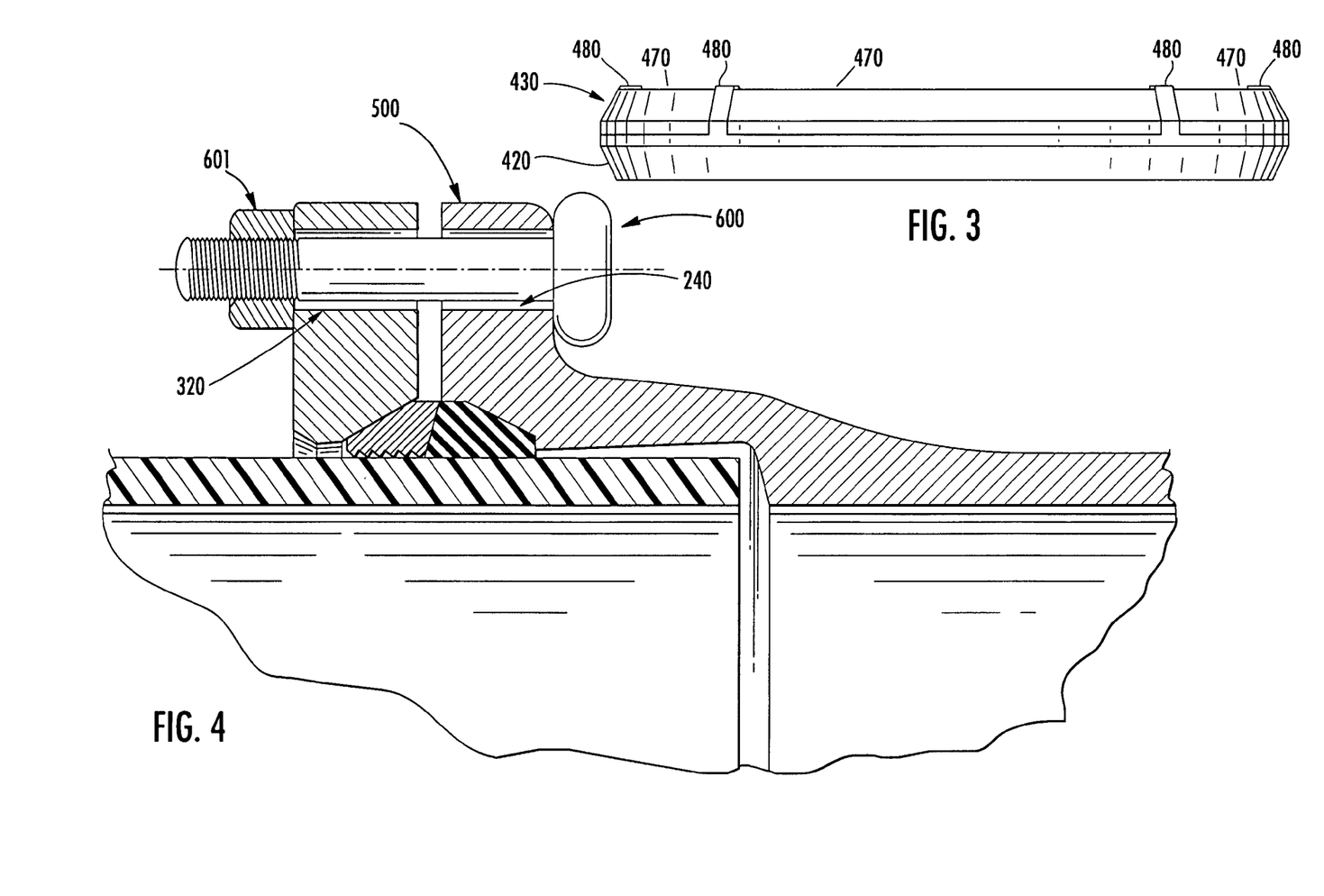
FIG. 3 is an elevational view of one embodiment of the restraining gasket of the present invention.
FIG. 4 is a cross-sectional view of an embodiment of the mechanical pipe joint of the present invention utilizing threaded connectors to attach the gland to the bell socket.
Figure 5:
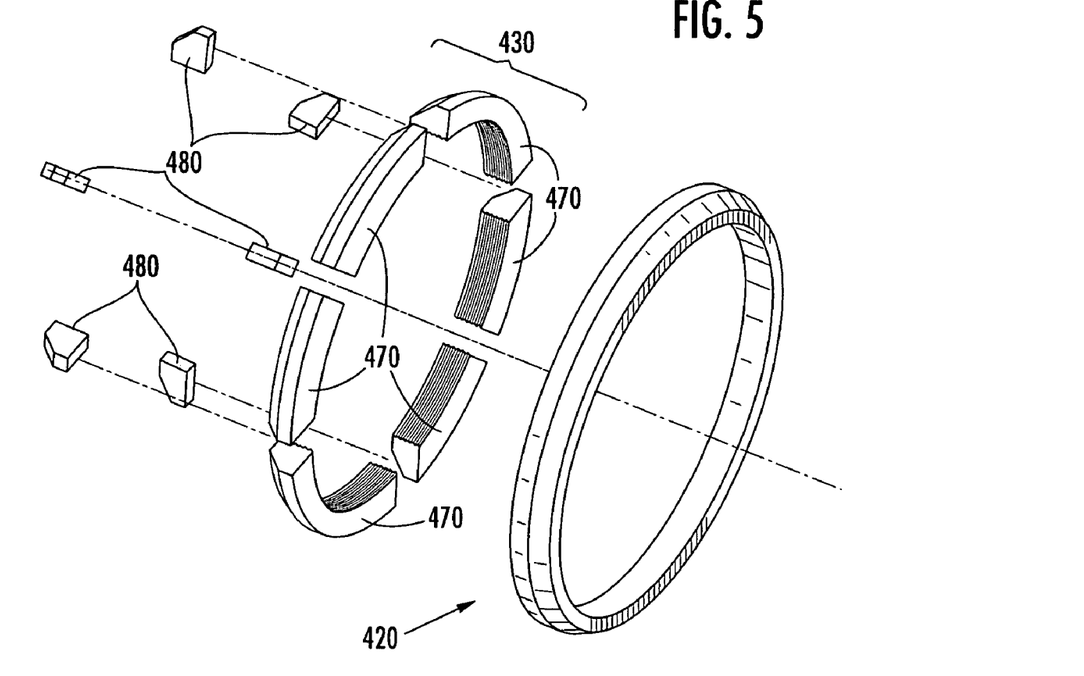
FIG. 5 is an exploded perspective view of the components of the restraining gasket of the present invention.

The sealing portion 420 of the restraining gasket 400 is preferably composed of an elastomeric material 410 so as to provide a fluid-tight seal in the circumferential sealing cavity 230 defined between the outer surface 110 of the male piping member 100 and the inner surface 220 of the bell socket 210. The sealing portion of the restraining gasket is configured to fill the sealing cavity 230 and part of the restraining portion of the restraining gasket may extend outside the bell socket. As shown in FIGS. 3 and 5, the restraining portion 430 of the restraining gasket 400 is composed of a plurality of circumferentially-spaced arcuate locking members 470 formed out of a rigid material. The locking members 470 can be composed out of unhardened metal, mild steel, ductile iron or ceramic for male piping members 100 made from a polymer. The locking members 470 can also be formed from a polymeric material if the material is harder than the polymer of the male piping member. For male piping members made of metal, the locking members are formed from a material that is harder than the metal of the male piping member, such as hardened steel. The arcuate locking members 470 are retained relative to each other by segments of the elastomeric material 410 extending axially between adjacent arcuate locking members 470 as shown in FIG. 3. The arcuate locking members of the restraining portion also include gripping means 460 for engaging the outer surface 110 of the male piping member 100. According to various embodiments of the present invention, the gripping means of the arcuate locking members may include, a grangular material, a plurality of teeth defined by the arcuate locking member material, an abrasive grit or other abrasive material affixed to the arcuate locking members, a plurality of radial ridges defined by the arcuate locking member material, or another textured material that is selected to have a gripping ability with respect to the outer surface of the male piping member.

In the mechanical joint of the present invention, the gland 300 is axially attached to the bell socket 210 so that a bearing surface 310 of the gland imparts a force on the restraining portion 430 of the restraining gasket 400. The restraining portion further transmits a partially axial force to seat and compress the sealing portion 420 of the restraining gasket 400 within the sealing cavity 230 defined by an inner surface 220 of the bell socket 210. The restraining portion also receives a partially radial force from the axial attachment force of the bearing surface 310 of the gland 300 so that the gripping means 460 of the restraining portion 430 are urged into contact with the outer surface 110 of the male piping member 100 so as to axially restrain the male piping member within the bell socket 210.

Referring now to FIG. 2, which depicts a cross-sectional view of the restraining gasket 400, an interface 440 is provided between the restraining portion 430 and the sealing portion 420 of the restraining gasket, the interface having a slope relative to the axis of the pipe. The slope of the interface is configured so that the axial attachment force imparted on the restraining portion of the restraining gasket is first transmitted to the sealing portion of the restraining gasket so that the sealing portion is compressed into the sealing cavity 230 depicted in FIG. 1. After the sealing portion 420 is fully compressed and seated within the sealing cavity 230, the axial attachment force imparted on the restraining portion 430 is directed in the radial direction by the axially-resistive force of the compressed sealing portion 420 so that the gripping means 460 of the restraining portion are urged into contact with the outer surface 110 of the male piping member 100, thereby restraining the male piping member within the bell socket 210.

The slope may be tailored to achieve an improved balance between axial and radial motion transmitted from the gland bearing surface to the restraining gasket, and in several embodiments of the present invention, the slope of the interface, or ramp angle (with respect to a plane that is normal to the pipe axis) may be set at 20 degrees, 15 degrees, or 10 degrees, respectively. In other embodiments this ramp angle may also be adjusted to provide an improved distribution of the force imparted by the gland bearing surface so as to delay the radially-inward, teeth-engaging motion of the locking members until after the sealing portion has been adequately compressed to achieve a satisfactory seal.

As shown in FIGS. 3 and 5, the restraining portion 430 of the restraining gasket 400 is composed of a plurality of arcuate locking members 470. In an advantageous embodiment of the restraining gasket of the present invention, the plurality of arcuate locking members 470 may be retained relative to each other by a separate plurality of spacers 480 that are composed of the same elastomeric material 410 as the sealing portion of the restraining gasket. Alternatively, the spacers 480 may be composed of a resilient second elastomeric material having a stiffness that exceeds the stiffness of the first elastomeric material 410 of the sealing portion, such that compression of the first elastomeric material occurs prior to the compression of the second elastomeric material so that the sealing portion of the restraining gasket is fully compressed within the sealing cavity 230 before the gripping means 460 of the arcuate locking members 470 are urged into contact with the outer surface of the male piping member.

Preferably, the spacers 480 relatively retain the arcuate locking members so that the arcuate locking members are initially suspended radially outward from the outer surface of the male piping member at a distance of approximately 0.100 inches. As the gland is tightened, these spacers become compressed in the circumferential direction as the locking members are forced closer together at their ends by the radially-inward motion imparted to them by the gland. In addition, the portion of the spacer radially-inward of the teeth and engaged against the male piping member outer surface becomes radially compressed. These compressions can be adjusted based on the elastomeric stiffness and dimensions of the spacers to allow the teeth to engage the outer surface of the male piping member only after the sealing portion of the gasket has been sufficiently compressed against the outer surface of the male piping member.

Additionally, in embodiments of the present invention using separate spacers 480, the spacers may also be affixed to the sealing portion 420 and to adjacent arcuate locking members 470 using a various adhesives or glues which are compatible with the varying types of spacer materials and arcuate locking member materials.

FIG. 4 depicts one advantageous embodiment of the mechanical pipe joint of the present invention wherein the gland 300 is axially attached to the bell socket 210 using a plurality of threaded connectors 600 extending through a first plurality of apertures 320 defined by the gland and a second plurality of apertures 240 defined by a flange 500 extending radially from the bell socket. According to this embodiment, the gland is gradually urged into contact with the restraining portion 430 of the restraining gasket 400 as the threaded connectors are tightened to axially attach the gland to the bell socket. In one embodiment, the threaded connectors are T-head bolts, as depicted in FIG. 4 which are secured axially through the corresponding first and second plurality of apertures 320, 240 by a plurality of threaded nuts 601.

Figure 6:
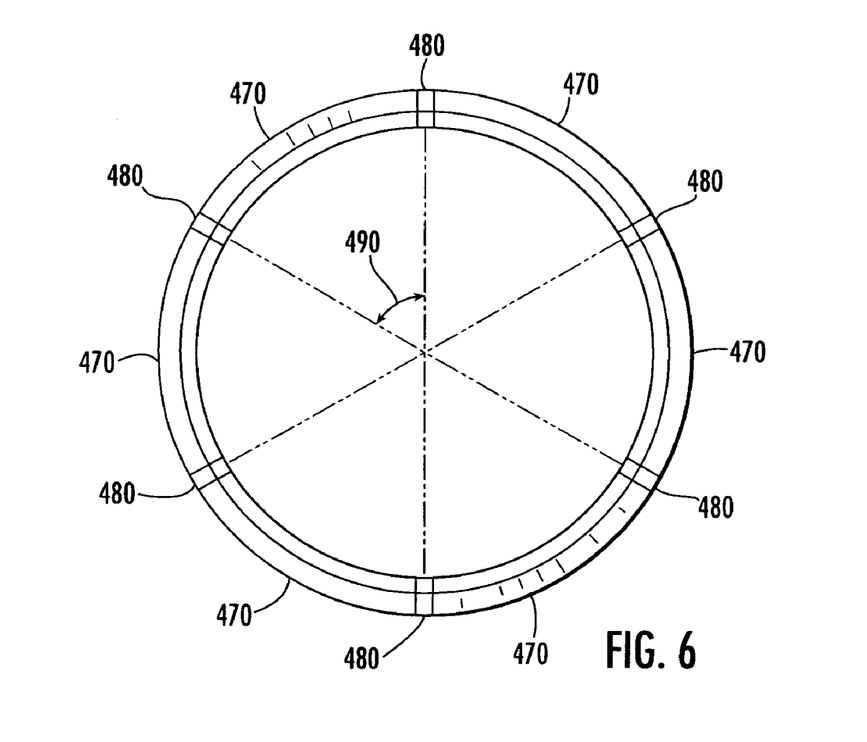
FIG. 6 is an elevational view of one embodiment of the restraining gasket of the present invention showing the arc length of the plurality of circumferentially-spaced arcuate locking members making up the restraining portion.

Referring now to FIG. 6, which shows a front view of the restraining gasket 400 according to one embodiment of the present invention, an arc length 490 of the arcuate locking members is shown. In the depicted embodiment, the arc length is approximately 60 degrees with respect to the pipe conduit axis, such that the restraining portion of the restraining gasket contains 6 arcuate locking members. In other embodiments, the arc length may be varied such that the restraining portion 430 is composed of more or less individual arcuate locking members 470 such as, for example, an arc length of 15 degrees.

Figure 7:
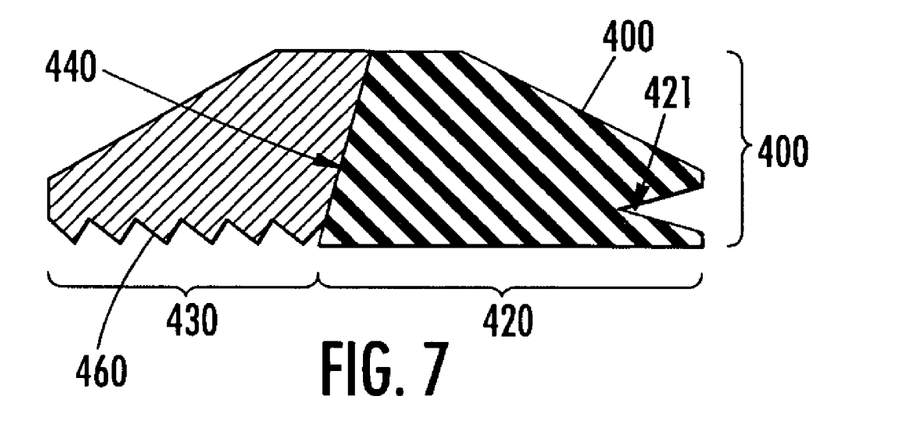
FIG. 7 is a cross-sectional view of another embodiment of the restraining gasket of the present invention employing a V-slit to further compress the sealing portion of the restraining gasket.

FIG. 7 shows an alternate embodiment of the restraining gasket 400 of the present invention wherein the sealing portion 420 includes a V-notch 421 that faces the bell socket 210 such that when the pipe conduit is pressurized with a flow of fluid, the V-notch fills with fluid so as to more fully expand the sealing such that the sealing cavity 230 is more completely filled by the sealing portion. In addition, the sealing portion of the restraining gasket may be fitted with a wiper seal so that the internal pressure generated within the connected piping members aids in compressing the sealing portion within the sealing cavity defined in the bell socket.

Figure 8:
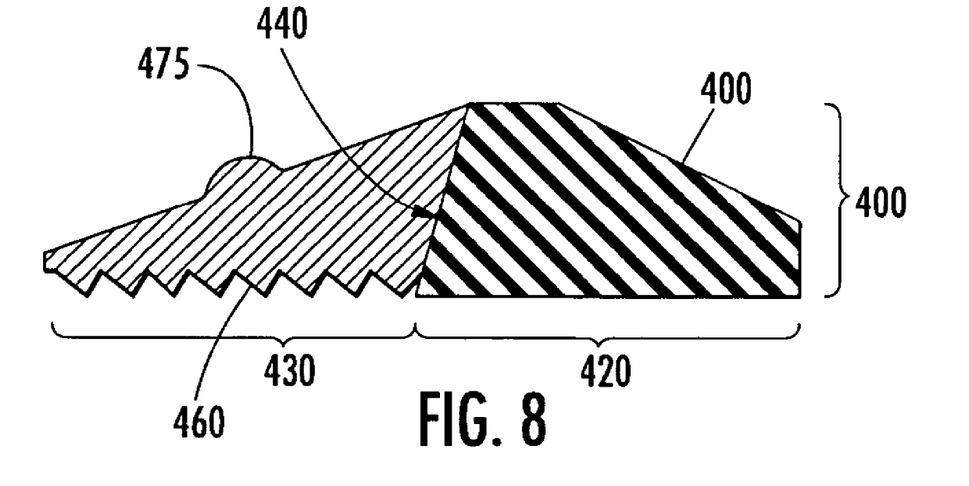
FIG. 8 is a cross sectional view of a locking member for use in another embodiment of the restraining gasket of the present invention employing a raised portion to reduce surface area and accompanying frictional interaction between a gland bearing surface and the locking member.

FIG. 8 shows an alternate embodiment of the arcuate locking member 470 of the present invention wherein the radially-outward surface of the arcuate locking member comprises a raised portion 475 extending circumferentially along the arc length of the arcuate locking member. The raised portion 475 reduces the frictional forces produced as the arcuate locking member 470 interacts with the bearing surface 310 of the gland 300. The raised portion 475 provides a reduced surface area of interaction between a radially-outward surface of the arcuate locking member 470 and the bearing surface 310 of the gland 300 such that less axial force is required during assembly of the mechanical pipe joint of the present invention. In addition, the raised portion 475 provided in this embodiment allows the cross-sectional profile of the arcuate locking segment 470 to be reduced. For example, the raised portion 475 may replace the flat surface of the arcuate locking segment (as depicted, for example, in FIG. 2) that would otherwise directly contact the bearing surface 310 of the gland 300.

Referring again to FIG. 1, a method for axially securing a male piping member within a bell socket is described. First, the components of the pipe joint are provided, including, the restraining gasket 400, the male piping member 100, the bell socket 210, and the gland 300. Next, the gland 300, followed by the restraining gasket 400, is placed respectively around the outer surface 110 of the male piping member so as to surround the male piping member. Then the male piping member, encircled by the restraining gasket and gland, is inserted into the bell socket so that the sealing portion of the restraining gasket is positioned within the sealing cavity 230 defined by the inner surface 220 of the bell socket. Finally, the gland is moved axially towards the bell socket so that the gasket is sandwiched axially between the gland and the bell socket. The gland defines a bearing surface 310 that contacts the restraining portion 430 of the restraining gasket. The gland is axially-attached to the bell socket so that the bearing surface of the gland is gradually brought into contact with the restraining portion of the restraining gasket.

As the bearing surface of the gland contacts the restraining portion, an axial force is first directed towards the sealing portion so that the elastomeric material 410 of the sealing portion is compressed within the sealing cavity 230 so that a fluid-tight seal is formed between the outer surface of the male piping member and the inner surface 220 of the bell socket. As the sealing portion becomes fully seated in the sealing cavity, the axial force produced by the bearing surface is then directed more in the radial direction so that the bearing surface of the gland then urges the gripping means 460 of the restraining portion of the restraining gasket into contact with the outer surface of the male piping member, thus axially-securing the male piping member within the bell socket with a fluid-tight seal provided by the fully-compressed and seated sealing portion of the restraining gasket.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A mechanical pipe joint for sealing and restraining adjoining fluid piping members along an axis, said joint comprising:
   a male piping member defining an outer surface;
   a female piping member comprising a bell socket for receiving the male piping member, the bell socket defining an inner surface having a circumference larger than the outer surface of the male piping member so as to define a sealing cavity therebetween;
   a gland extending at least partially around the male piping member and being configured for axial engagement with the bell socket, the gland defining at least one bearing surface that is forced axially as the gland is axially engaged with the bell socket; and
   a restraining gasket for sealing and restraining the male piping member relative to the female piping member, the restraining gasket being formed at least in part of an elastomeric material and comprising:
   a sealing portion that fits substantially within the sealing cavity and provides a fluid seal between the inner surface of the bell socket and the outer surface of the male piping member; and
   a restraining portion that surrounds the male piping member predominantly outside of the sealing cavity when the mechanical pipe joint is assembled, and wherein said restraining portion comprises a plurality of circumferentially-spaced arcuate locking members formed from a rigid material and configured to be operably engaged between the bearing surface of the gland and the outer surface of the male piping member as the gland is axially attached to the bell socket so as to restrain the male piping member within the bell socket, wherein the locking members are retained relative to each other and are each circumferentially interconnected by the sealing portion before the attachment of the gland to the bell socket.

2. The mechanical pipe joint according to claim 1, wherein the elastomeric material comprises the sealing portion, and wherein a plurality of spacers are adhesively attached to the sealing portion, and wherein the circumferentially-spaced arcuate locking members are retained relative to each other by the plurality of spacers.

3. The mechanical pipe joint according to claim 2, wherein the plurality of spacers are composed of a second elastomeric material having a different stiffness than the stiffness of the elastomeric material of the sealing portion.

4. The mechanical pipe joint according to claim 2, wherein each spacer is located circumferentially between two of the circumferentially-spaced arcuate locking members such that the plurality of circumferentially-spaced arcuate locking members are suspended out of contact with the outer surface of the male piping member at a distance of about 0.100 inches from the outer surface of the male piping member before the attachment of the gland to the bell socket.

5. The mechanical pipe joint according to claim 1, wherein the plurality of circumferentially-spaced arcuate locking members are configured to restrain the outer surface of the male piping member with a means for gripping the outer surface of the male piping member, the gripping means selected from the group consisting of:
   a plurality of teeth;
   an abrasive grit;
   a granular material; and
   a plurality of radial ridges.

6. The mechanical pipe joint according to claim 1, farther comprising an interface between the sealing portion and the restraining portion, the interface defining a slope, the slope being configured to convert an axial force of the at least one bearing surface of the gland into a partially-axial force and a partially-radial force on the restraining gasket.

7. The mechanical pipe joint according to claim 6, wherein the slope is directed radially outward towards the bell socket at an angle of approximately 10 to 20 degrees with respect to a plane that is perpendicular to the axis, such that the partially-axial force is exerted first on the sealing portion, and the partially-radial force is exerted second on the plurality of circumferentially-spaced arcuate locking members so that the axial force of the at least one bearing surface of the gland seals the sealing cavity about the male piping member before urging the plurality of circumferentially-spaced arcuate locking members into engagement with the outer surface of the male piping member so as to axially secure the male piping member within the bell socket.

8. The mechanical pipe joint according to claim 7, wherein the slope is directed radially outward towards the bell socket at an angle of approximately 15 degrees, with respect to a plane that is perpendicular to the axis.

9. The mechanical pipe joint according to claim 1, wherein an arc length of each of the plurality of circumferentially-spaced arcuate locking members is at least 15 degrees with respect to the axis.

10. The mechanical pipe joint according to claim 1, wherein an arc length of each of the plurality of circumferentially-spaced arcuate locking members is about 60 degrees with respect to the axis.

11. The mechanical pipe joint according to claim 1, wherein the bell socket is made of ductile iron, and wherein the male piping member is made of polyvinyl chloride.

12. The mechanical pipe joint according to claim 11, wherein the rigid material is selected from the group consisting of:
   mild steel;
   ductile iron;
   ceramic; and
   plastic having a hardness greater than that of the polyvinyl chloride of the male piping member.

13. The mechanical pipe joint according to claim 1, wherein the bell socket and the male piping member are made of ductile iron.

14. The mechanical pipe joint according to claim 1, further comprising a flange operably engaged with the bell socket, the flange extending radially outward from the bell socket and wherein the flange further defines a first plurality of apertures extending through the flange parallel to the axis, and wherein the gland further defines a second plurality of apertures configured to correspond axially with the first plurality of apertures and to accept a plurality of threaded connectors configured to axially attach the gland to the bell socket.

15. A method of sealing and axially securing a male piping member within an adjoining bell socket along an axis, the bell socket defining a sealing cavity between an inner surface of the bell socket and an outer surface of the male piping member, the method comprising;
   providing a restraining gasket adapted to surround the male piping member, the restraining gasket being formed at least in part of an elastomeric material and having a sealing portion and a restraining portion, the restraining portion comprising a plurality of circumferentially-spaced arcuate locking members formed from a rigid material and wherein the locking members are retained relative to each other and are each circumferentially interconnected by the sealing portion
   surrounding the male piping member with the restraining gasket;
   inserting the male piping member into the bell socket such that the sealing portion of the restraining gasket is positioned about the male piping member substantially within the sealing cavity so that a fluid seal is formed between the inner surface of the bell socket and the outer surface of the male piping member; and
   attaching a gland to the bell socket, the gland extending at least partially around the male piping member and the gland defining at least one bearing surface, such that the at least one bearing surface produces an attachment force directed substantially parallel to the axis, on the plurality of circumferentially-spaced arcuate locking members so that the locking members are urged into engagement with the male piping member so as to axially secure the male piping member within the bell socket and so that the restraining portion of the restraining gasket surrounds the outer surface of the male piping member predominantly outside the sealing cavity.

16. A method according to claim 15, wherein the providing step further comprises providing a plurality of elastomeric material components, the elastomeric material components comprising the sealing portion, and a plurality of spacers adhesively attached to the sealing portion, the plurality of spacers being configured to retain the plurality of circumferentially-spaced arcuate locking members relative to each other.

17. A method according to claim 16, wherein the providing step further comprises providing the plurality of spacers composed of a second elastomeric material having a different stiffness than the stiffness of the elastomeric material of the sealing portion.

18. A method according to claim 16, further comprising a suspending step, occurring before the attaching step, the suspending step comprising locating the spacers circumferentially between two of the circumferentially-spaced arcuate locking members such that the plurality of circumferentially-spaced arcuate locking members are suspended out of contact with the outer surface of the male piping member at a distance of about 0.100 inches from the outer surface of the male piping member before the attachment of the gland to the bell socket.

19. A method according to claim 15, wherein the providing step further comprises providing a surface located on the radially inner surface of each arcuate locking member, the surface selected from the group consisting of:
   a plurality of teeth;
   an abrasive grit;
   a granular material; and
   a plurality of radial ridges.

20. A method according to claim 15 wherein the providing step further comprises providing an interface between the sealing portion and the restraining portion, the interface defining a slope, the slope being configured to convert the attachment force of the at least one bearing surface of the gland into a partially-axial force and a partially-radial force on the gasket.

21. A method according to claim 20, wherein the providing step further comprises adjusting the slope to be directed radially outward towards the bell socket, such that the partially-axial force is exerted first on the sealing portion, and the partially radial force is exerted second on the plurality of circumferentially-spaced arcuate locking members so that the attachment force of the at least one bearing surface of the gland seals the sealing cavity about the male piping member before urging the plurality of circumferentially-spaced arcuate locking members into engagement with the outer surface of the male piping member so as to axially secure the male piping member within the bell socket.

22. A method according to claim 15, wherein the providing step further comprises providing one or more of the plurality of circumferentially-spaced arcuate locking members with an arc length of at least 15 degrees with respect to the axis.

23. A method according to claim 15, wherein the providing step further comprises providing one or more of the plurality of circumferentially-spaced arcuate locking members with an arc length of about 60 degrees with respect to the axis.

24. A method according to claim 15, wherein the providing step further comprises providing the rigid material from the group consisting of:
   hardened metal;
   mild steel;
   ductile iron;
   ceramic; and
   plastic having a hardness greater than that of any polyvinyl chloride.

25. A method according to claim 15, wherein the attaching step further comprises attaching the gland to the bell socket using a plurality of threaded connectors such that the at least one bearing surface of the gland is gradually brought into contact with the plurality of circumferentially-spaced arcuate locking members.

* * * * *

UNITED STATES PATENT AND TRADEMARK OFFICE
CERTIFICATE OF CORRECTION

PATENT NO. : 7,207,606 B2 Page 1 of 1
APPLICATION NO. : 10/827159
DATED : April 24, 2007
INVENTOR(S) : Owen et al.

It is certified that error appears in the above-identified patent and that said Letters Patent is hereby corrected as shown below:

Column 10,
Line 40: "farther" should read --further--

Signed and Sealed this

Nineteenth Day of June, 2007

JON W. DUDAS
*Director of the United States Patent and Trademark Office*